(12) United States Patent
Zhao et al.

(10) Patent No.: US 9,053,843 B2
(45) Date of Patent: Jun. 9, 2015

(54) GRAPHENE HYBRID STRUCTURES FOR ENERGY STORAGE APPLICATIONS

(71) Applicant: Bluestone Technologies (Cayman) Limited, Grand Cayman (KY)

(72) Inventors: Xin Zhao, Wappingers Falls, NY (US); Xuesong Li, Wappingers Falls, NY (US); Yu-Ming Lin, West Harrison, NY (US)

(73) Assignee: Bluestone Technologies (Cayman) Limited, Grand Cayman (KY)

( * ) Notice: Subject to any disclaimer, the term of this patent is extended or adjusted under 35 U.S.C. 154(b) by 228 days.

(21) Appl. No.: 13/746,730

(22) Filed: Jan. 22, 2013

(65) Prior Publication Data

US 2014/0205902 A1    Jul. 24, 2014

(51) Int. Cl.
| | |
|---|---|
| *H01M 4/13* | (2010.01) |
| *H01B 13/30* | (2006.01) |
| *H01M 4/04* | (2006.01) |
| *H01M 4/36* | (2006.01) |
| *H01G 11/24* | (2013.01) |
| *H01G 11/30* | (2013.01) |
| *H01G 11/86* | (2013.01) |

(52) U.S. Cl.
CPC .............. *H01B 13/30* (2013.01); *H01M 4/0416* (2013.01); *H01M 4/366* (2013.01); *Y02E 60/13* (2013.01); *H01G 11/24* (2013.01); *H01G 11/30* (2013.01); *H01G 11/86* (2013.01)

(58) Field of Classification Search
CPC ..... H01B 13/30; H01G 11/00; H01M 4/0416; H01M 4/366; H01M 2004/022; H01M 4/583

USPC ............... 429/209, 212, 231.4, 231.8, 231.95
See application file for complete search history.

(56) References Cited

U.S. PATENT DOCUMENTS

| | | | |
|---|---|---|---|
| 6,225,003 B1 * | 5/2001 | Krawiec et al. ............... | 429/217 |
| 2013/0164612 A1 * | 6/2013 | Tanemura et al. ............ | 429/211 |

OTHER PUBLICATIONS

B. Hertzberg et al., Deformations in Si—Li Anodes Upon Electrochemical Alloying in Nano-Confined Spaces, Journal of the American Chemical Society Communications, 2010, pp. 8548-8549, vol. 132, American Chemical Society, USA.
C. Lee et al., Measurement of the Elastic Properties and Intrinsic Strength of Monolayer Graphene, Science, 2008, pp. 385-388, vol. 321, American Association for the Advancement of Science, USA.
X. Li et al., Large-Area Synthesis of High-Quality and Uniform Graphene Films on Copper Foils, Science, 2009, pp. 1312-1314, vol. 324, American Association for the Advancement of Science, USA.

(Continued)

*Primary Examiner* — Patrick Ryan
*Assistant Examiner* — Ben Lewis
(74) *Attorney, Agent, or Firm* — Alan D. Kamrath; Kamrath IP Lawfirm, P.A.

(57) ABSTRACT

Aspects of the invention are directed to a method for forming a hybrid structure. Initially, a wire is received and an encapsulating film is deposited on the wire. Subsequently, the wire is selectively removed to leave a hollow tube formed of the encapsulating film. A plurality of active particles are then placed into the hollow tube by immersing the hollow tube in a suspension comprising the plurality of active particles and a liquid. Lastly, the hollow tube and the plurality of active particles therein are removed from the suspension and allowed to dry so as to form a cluster of active particles at least partially encapsulated by the encapsulating film.

13 Claims, 7 Drawing Sheets

(56) References Cited

OTHER PUBLICATIONS

Y. Wang et al., The Design of a LiFePO4/Carogn Nanocomposite with a Core-Shell Structure and Its Synthesis by an In Situ Polymerization Restriction Method, Angewandte Chemie, 2008, pp. 7461-7465, vol. 47, Wiley-VCH Verlag GmbH & Co. Weinheim.

W. Zhang et al., Carbon Coated Fe3O4 Nanospindles as a Superior Anode Material for Lithium-Ion Batteries, Advanced Functional Materials, 2008, pp. 1-6, vol. 18, Wiley-VCH Verlag GmbH & Co. Weinheim.

N.J. Dudney, Thin Film Micro-Batteries, Interface, Fall 2008, pp. 44-48, The Electrochemical Society, USA.

* cited by examiner

FIG. 10A  FIG. 10B  FIG. 10C

GRAPHENE HYBRID STRUCTURES FOR ENERGY STORAGE APPLICATIONS

FIELD OF THE INVENTION

The present invention relates generally to energy storage devices, and, more particularly, to graphene-based hybrid structures for use in the electrodes of energy storage devices such as batteries and supercapacitors.

BACKGROUND OF THE INVENTION

The pressing need for advanced battery technologies constitutes the driving force in developing new electrode formulations to replace conventional intercalation compounds and carbonaceous materials in current lithium-ion batteries and supercapacitors. Electrochemically active metals and metalloids that can form intermetallic alloys with lithium, such as silicon, germanium, and tin, as well as transition metal oxides that can react with lithium ions reversibly via conversion reactions, such as tin dioxide, iron oxide, and manganese dioxide, have great potential to radically boost the energy density of lithium-ion batteries. Nevertheless, despite their promise as electrode materials, these materials generally have relatively low electrical conductivities and also suffer from enormous volumetric expansion/contraction dynamics during charge/discharge cycling as a result of the lithiation/delithiation processes. These large volumetric changes often result in the pulverization of the electrode materials. Once fragmented in this manner, side reactions may then occur at the freshly formed electrode/electrolyte interfaces, and the electrode fragments may become isolated by the newly formed side products and lose electrical contact. These unwanted side reactions also gradually deplete the available electrolyte, and severely hinder the rate capability and deep cycling ability of the electrodes. Device performance and lifespan are thereby limited.

Attempts to address these deficiencies have included surrounding active nanomaterials with carbonaceous shells. In one approach, for example, carbon layers have been deposited onto active nanowires via the calcination of organic carbon precursors. In another approach, active nanoparticles have been inserted into carbon nanotubes. Nevertheless, in the former approach, the carbon coatings have tended to be highly defective and, as a result, have tended to exhibit low electrical conductivities. Moreover, in both approaches, the carbonaceous shells have tended to lose contact with the active materials or to rupture during cycling due to the stiffness of the shells. Once the carbonaceous shells are so compromised, the active materials are again exposed to unwanted side reactions with the electrolyte.

For the foregoing reasons, there is a need for alternative electrode technologies for use in high-performance energy storage devices such as batteries and supercapacitors that do not suffer from the several disadvantages described above.

SUMMARY OF THE INVENTION

Embodiments of the present invention address the above-identified needs by providing novel hybrid structures suitable for use in the electrodes of high-performance energy storage devices.

Aspects of the invention are directed to a method for forming a hybrid structure. Initially, a wire is received and an encapsulating film is deposited on the wire. Subsequently, the wire is selectively removed to leave a hollow tube formed of the encapsulating film. A plurality of active particles are then placed into the hollow tube by immersing the hollow tube in a suspension comprising the plurality of active particles and a liquid. Lastly, the hollow tube and the plurality of active particles therein are removed from the suspension and allowed to dry so as to form a cluster of active particles at least partially encapsulated by the encapsulating film.

Other aspects of the invention are directed to an electrode for use in an energy storage device. The electrode comprises a plurality of hybrid structures. Each of the plurality of hybrid structures, in turn, comprises a respective cluster of active particles that are at least partially encapsulated by a respective encapsulating film. Each of the plurality of hybrid structures is substantially elongate in shape.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

Figure 1:
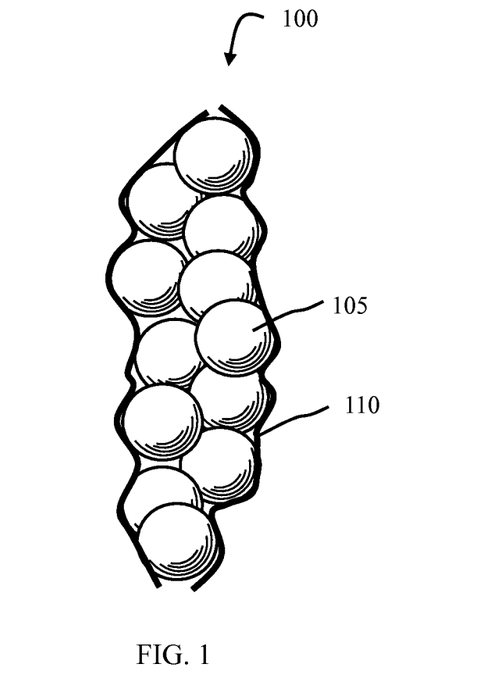
FIG. 1 shows a diagrammatic representation of a hybrid structure in accordance with a first illustrative embodiment of the invention.

FIG. 1 shows a diagrammatic representation of a portion of a hybrid structure 100 in accordance with an illustrative embodiment of the invention. The hybrid structure 100 comprises active particles 105 that are encapsulated by an encapsulating film 110. For clarity, the frontal portion of the encapsulating film 110 is made transparent to display the encapsulated active particles 105 therein.

In the present illustrative embodiment, the encapsulating film 110 in the hybrid structure 100 comprises one or more layers of graphene. Graphene substantially consists of a one-atomic-layer-thick sheet of $sp^2$-bonded carbon. High quality graphene can be synthesized by chemical vapor deposition (CVD). U.S. Patent Publication No. 2011/0091647, to Colombo et al. and entitled "Graphene Synthesis by Chemical Vapor Deposition," hereby incorporated by reference herein, for example teaches the CVD of graphene on metal and dielectric substrates using hydrogen and methane in an otherwise largely conventional CVD tube furnace reactor. A metal substrate is loaded into the CVD tube furnace reactor and hydrogen gas is introduced at a rate between 1 to 100 standard cubic centimeters per minute (sccm) while heating the substrate to a temperature between 400 degrees Celsius (° C.) and 1,400° C. These conditions are maintained for a duration of between 0.1 to 60 minutes. Next methane is introduced into the CVD tube furnace reactor at a flow rate between 1 to 5,000 sccm at between 10 mTorr to 780 Torr of pressure while reducing the flow rate of hydrogen gas to less than 10 sccm. Graphene is synthesized on the metal substrate over a period of time between 0.001 to 10 minutes following the introduction of the methane. The same reference also teaches that the size of CVD graphene sheets (i.e., size of CVD graphene domains) may be controlled by varying CVD growth parameters such as temperature, methane flow rate, and methane partial pressure. The number of graphene layers (i.e., a single layer or more than one layer) can be regulated by modulating hydrogen flow rates, with higher flow rates tending to favor fewer graphene layers.

For applications related to energy storage, the active particles 105 preferably comprise: an electrochemically active metal or metalloid that can form intermetallic alloys with lithium; a transition metal oxide or conducting polymeric material that can react with lithium reversibly via conversion reactions; or an intercalation material or compound that can host lithium ions in its lattice. Suitable electrochemically active metals and metalloids include, but are not limited to, silicon (Si), germanium (Ge), and tin (Sn). Suitable transition metal oxides include, but are not limited to, tin dioxide ($SnO_2$), iron oxide ($Fe_xO_y$), and manganese dioxide ($MnO_2$). Suitable conducting polymeric materials include, but are not limited to, polyaniline (PANi), polypyrrole (PPy), and poly (3,4-ethylenedioxythiophene) (PEDOT). Lastly, suitable intercalation materials include, but are not limited to, graphite, lithium metal phosphates such as lithium iron phosphate ($LiFePO_4$) and lithium manganese phosphate ($LiMnPO_4$), and lithium metal oxides such as lithium cobalt oxide ($LiCoO_2$), lithium manganese oxide ($LiMn_2O_4$), lithium nickel oxide ($LiNiO_2$), and lithium nickel manganese cobalt oxide ($Li(Li_xNi_aMn_bCo_c)O_2$). In the illustrative embodiment shown in FIG. 1, the active particles 105 are spherical, but other suitable morphologies or combinations of morphologies may also be utilized (e.g., rods, pills, sheets, faceted shapes). The spherical active particles 105 may have diameters between about ten nanometers and about ten micrometers, although this range is again only illustrative and dimensions outside this range would still come within the scope of the invention. Suitable active particles are available from a number of commercial sources including US Research Nanomaterials, Inc. (Houston, Tex., USA).

Figure 2:
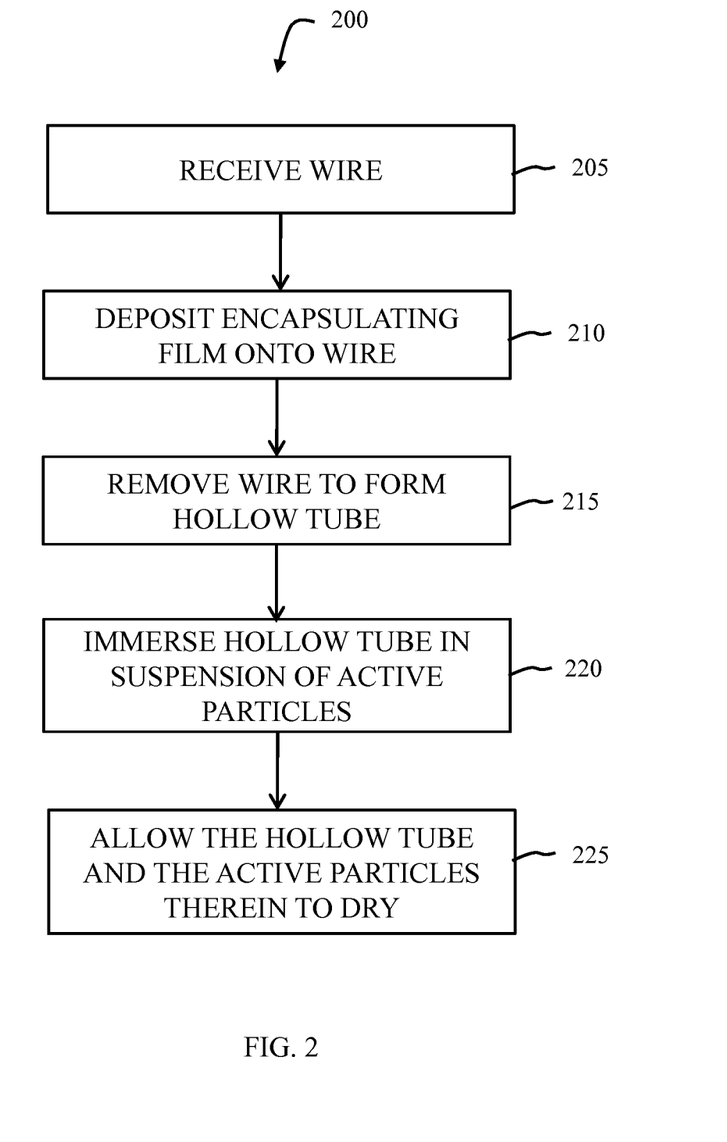
FIG. 2 shows a flow diagram of a method for forming the FIG. 1 hybrid structure, in accordance with an illustrative embodiment of the invention.

FIG. 2 shows a flow diagram of a method 200 for forming the hybrid structure 100 in accordance with an illustrative embodiment of the invention. At the same time, FIGS. 3A-3G show diagrammatic representations of intermediate structures in the illustrative method 200. Advantageously, while the sequence of steps and the ultimate products are entirely novel, the exemplary processing sequence utilizes several fabrication techniques (e.g., CVD, baking, wet chemical etching, centrifugation, drying, etc.) that will already be familiar to one having ordinary skill in, for example, the semiconductor and nanotechnology fabrication arts. Many of these conventional fabrication techniques are also described in readily available publications, such as: W. Choi, et al., *Graphene: Synthesis and Applications*, CRC Press, 2011; E. Tsotsas et al., *Modern Drying Technology: Product Quality and Formulation*, John Wiley & Sons, 2011; D. B. Mitzi, *Solution Processing of Inorganic Materials*, John Wiley & Sons, 2009; and M. Kohler, *Etching in Microsystem Technology*, John Wiley & Sons, 2008, which are all hereby incorporated by reference herein. The conventional nature of many of the fabrication techniques further facilitates the use of largely conventional and readily available tooling.

Figure 3A:
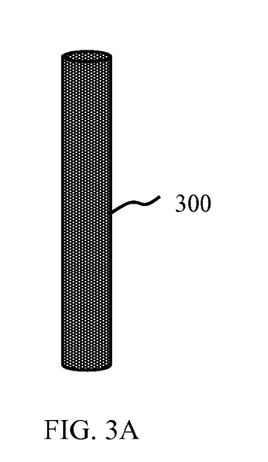
FIGS. 3A-3G show diagrammatic representations of intermediate structures in the FIG. 2 method.
Figure 3B:
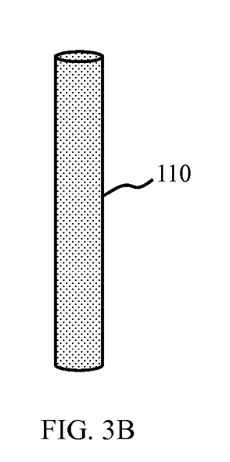
Figure 3C:
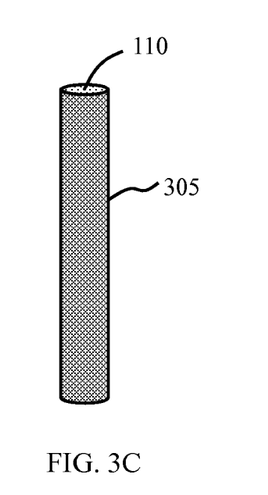
Figure 3D:
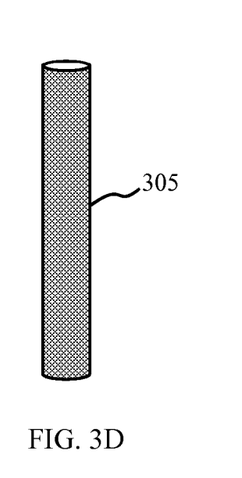

The exemplary method 200 starts in step 205 of FIG. 2 and in FIG. 3A with the receiving of a wire 300. In this particular embodiment, the wire 300 comprises copper (Cu), but other equally suitable wire compositions (e.g., nickel (Ni)) may also be utilized. In step 210, the encapsulating film 110, in this case graphene, is deposited onto the wire 300. The graphene may, for example, be formed by CVD in a CVD tube furnace reactor, as detailed above. After this processing, the encapsulating film 110 (comprising one or more layers of graphene) is present on the surface of the wire 300, as shown in FIG. 3B.

Figure 3E:
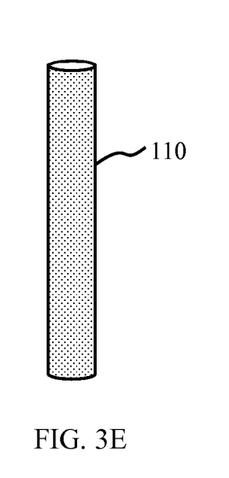

Subsequently, in step 215, the wire 300 is selectively removed from the intermediate structure in FIG. 3B. In the present embodiment, this removal of the wire 300 is performed utilizing a multistep process. More particularly, initially, a thermoplastic material 305 is deposited onto the FIG. 3B intermediate structure such that one end of the encapsulating film 110 and the wire 300 are left uncoated. This results in the intermediate structure shown in FIG. 3C. The thermoplastic material 305 may comprise, as just one example, poly (methyl methacrylate) (PMMA), a commonly utilized photoresist material, which may be deposited by conventional spin coating or dip coating. The thermoplastic-coated intermediate structure is then exposed to wet chemical etching to actually remove the wire 300, yielding the intermediate structure shown in FIG. 3D. If the wire 300 comprises copper, the wire 300 can be removed by immersing the FIG. 3D intermediate structure into an etchant comprising ferric chloride ($FeCl_3$), hydrochloric acid (HCl), and water. During the chemical etching the exposed encapsulating film 110 at the uncoated end of the wire 300 is lost, while the remainder of the encapsulated film 110 remains intact under the thermoplastic coating. The thermoplastic material 305 is then stripped by, for example, rinsing with acetone ($C_3H_6O$). With the wire 300 removed in this manner, a hollow tube formed of the encapsulating film 110 remains, as shown in FIG. 3E.

Figure 3F:
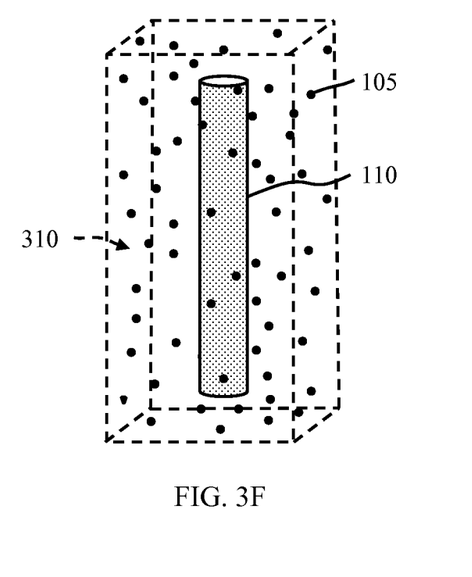
Figure 3G:
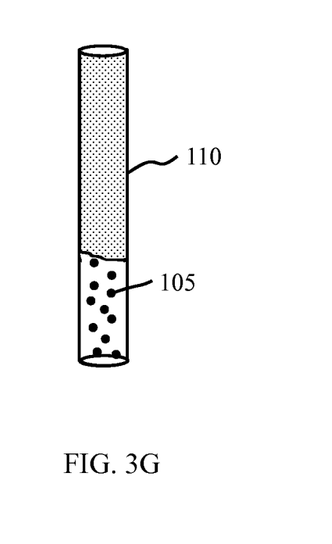

The active particles 105 are inserted into the hollow tube of the encapsulating film 110 by immersing the hollow tube in a suspension comprising the active particles 105 in a liquid 310, as indicated in step 220 of FIG. 2 and in FIG. 3F. In so doing, the active particles 105 enter the hollow tube of the encapsulating film 110 via the tube's opening. As was detailed above, the active particles 105 may comprise, as just a few examples, a suitable metal or metalloid, a suitable transition metal oxide, a suitable intercalation material, or a suitable conductive polymer. Appropriate liquids 310 for use in the suspension include, but are not limited to, water, ethanol, isopropanol, tetrahydrofuran (THF), and N-methyl-2-pyrrolidone (NMP). Once the hollow tube of the encapsulating film 110 is filled with the active particles 105, it is separated from the suspension by, for example, centrifugation or being captured by filtration. The result of this separation is the intermediate shown in FIG. 3G (shown as a partially broken view), that is a wet hollow tube of the encapsulating film 110 with active particles 105 therein.

The final step, step 225, in the method 200 of FIG. 2 comprises allowing the hollow tube of the encapsulating film 110 and the active particles 105 therein to dry. The drying may be accomplished by, for example, air drying with or without gentle baking. The drying causes the encapsulating film 110 (i.e., graphene) to shrink and collapse onto the surface of the active particles 105 due to surface tension forces. The resulting structure in this particular embodiment is a hybrid structure similar to the hybrid structure 100 shown in FIG. 1.

Figure 4:
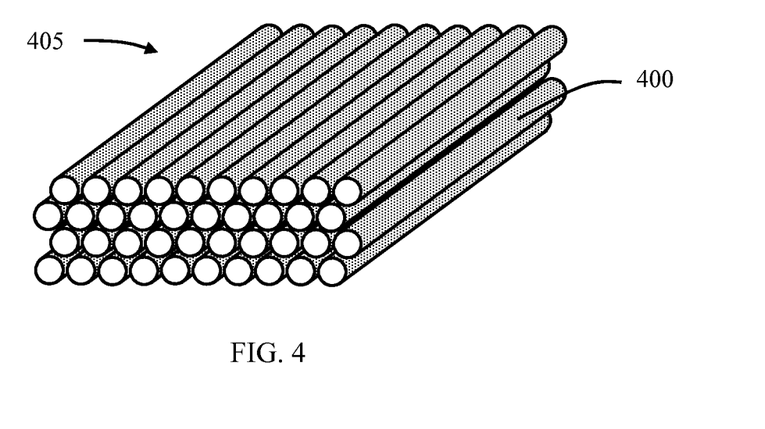
FIG. 4 shows a diagrammatic representation of a portion of a first illustrative electrode incorporating the FIG. 1 hybrid structure.
Figure 9:
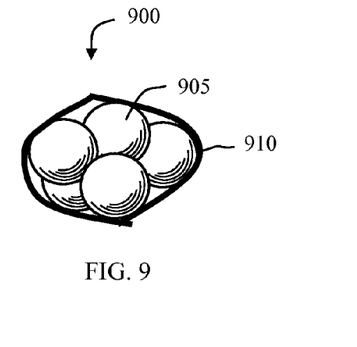
FIG. 9 shows a diagrammatic representation of a hybrid structure in accordance with a second illustrative embodiment of the invention.

Hybrid structures in accordance with aspects of the invention may be utilized in a variety of energy storage devices. They may, for example, be used to form electrodes for use in lithium-ion batteries and supercapacitors (also frequently called "ultracapacitors" and "supercondensers," and including "electrochemical double-layer capacitors" (EDLCs) and "pseudocapacitors"). FIGS. 4 and 9 show diagrammatic representations of respective portions of two such hybrid-structure-based electrodes, with the hybrid structures represented as simple cylinders for ease of understanding. In FIG. 4, a plurality of hybrid structures 400 are aligned to form a self-supported, aligned electrode 405. In contrast, in FIG. 5 multiple arrays of hybrid structures 500 are cross-stacked to create a laminated film electrode 505.

Figure 5:
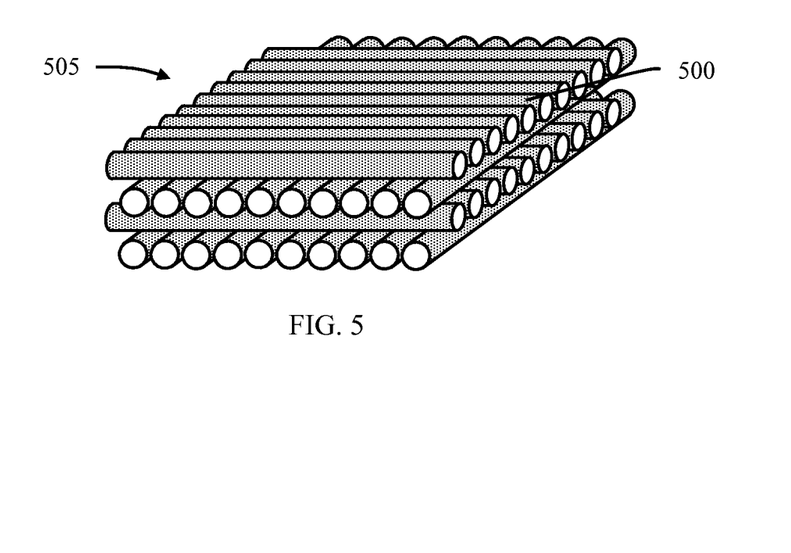
FIG. 5 shows a diagrammatic representation of a portion of a second illustrative electrode incorporating the FIG. 1 hybrid structure.
Figure 6:
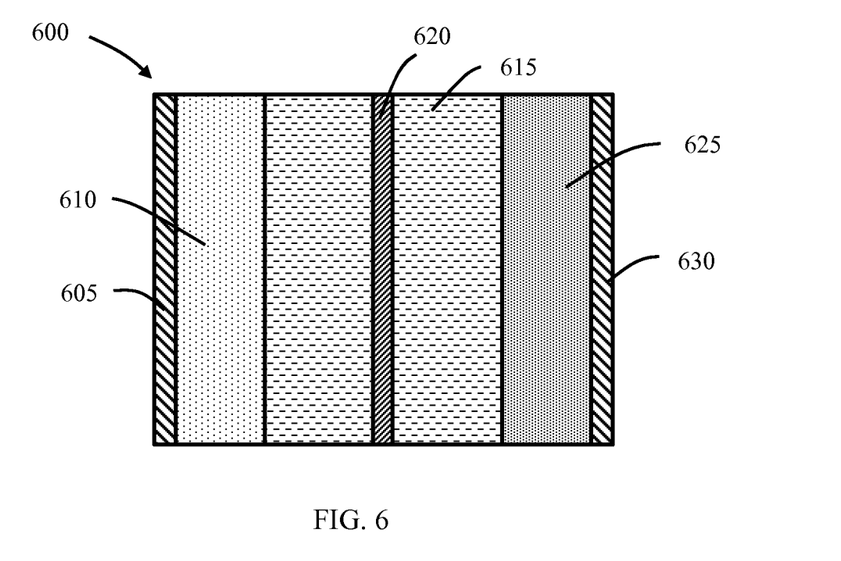
FIG. 6 shows a sectional view of an illustrative battery capable of utilizing the electrodes shown in FIGS. 4 and 5.

FIG. 6 shows a sectional view of an illustrative lithium-ion battery 600 capable of utilizing hybrid-structure-based electrodes, including the electrodes 405, 505 shown in FIGS. 4 and 5, respectively. The lithium-ion battery 600 includes a cathode current collector 605, a cathode 610, an electrolyte 615, a separator 620, an anode 625, and an anode current collector 630. Such lithium-ion batteries (without the novel electrodes described herein) are generally described in several references, including K. Ozawa, Lithium Ion Rechargeable Batteries, John Wiley & Sons, 2012, which is hereby incorporated by reference herein.

Hybrid-structure-based electrodes may be variously used to form both the cathode 610 and the anode 625 in the lithium-ion battery 600. In one non-limiting illustrative embodiment, for example, a hybrid-structure-based electrode forms the anode 625 and includes active particles comprising an electrochemically active metal or metalloid (e.g., Si, Ge, Sn), a transition metal oxide (e.g., $SnO_2$, $Fe_xO_y$, $MnO_2$), or a conducting polymeric material (e.g., PANi, PPy, PEDOT). The cathode 610 consists of an intercalation material (e.g., $LiFePO_4$, $LiMnPO_4$, $LiCoO_2$, $LiMn_2O_4$, $LiNiO_2$, $Li(Li_aNi_b Mn_cCo_d)O_2$)), a polymeric binder, and conducting carbon black or graphite. In another illustrative embodiment, a hybrid-structure-based electrode instead forms the cathode 610 and includes active particles comprising an intercalation material, while the anode 625 consists of graphite flakes, a polymeric binder, and conducting carbon black. Finally, in a last illustrative embodiment, both the cathode 610 and the anode 625 are formed from hybrid-structure-based electrodes in conformity with aspects of the invention. In this case, the cathode 610 contains active particles comprising an intercalation material, while the anode 625 includes active particles comprising an electrochemically active metal, a transition metal oxide, a conducting polymer, or carbon.

In any one of these several variations of the lithium-ion battery 600, the cathode current collector 605 may comprise, for example, aluminum (Al), while the anode current collector 630 may comprise, for example, copper (Cu). The separator 620 may be a microporous membrane that may be made from polyolefins, including, but not limited to, polyethylene, polypropylene, and polymethylpentene. Such separators are commercially available from sources such as Celgard LLC, (Charlotte, N.C., USA). The electrolyte 615 may consist of a lithium metal salt solvated in an appropriate solvent. Typical electrolytes include a lithium salt such as lithium hexafluorophosphate ($LiPF_6$), lithium tetrafluoroborate ($LiBF_4$), and lithium perchlorate ($LiClO_4$) in an organic solvent such as ethylene carbonate, dimethyl carbonate, and diethyl carbonate.

A supercapacitor has a structure similar to the lithium-ion battery 600 illustrated in FIG. 6, and therefore is not separately illustrated herein. Supercapacitors (without hybrid-structure-based electrodes like those set forth herein) are widely manufactured and are generally described in several references, including B. E. Conway, Electrochemical Supercapacitors: Scientific Fundamentals and Technological Applications, Springer, 1999, which is hereby incorporated by reference herein. In one non-limiting embodiment of a supercapacitor, a hybrid-structure-based electrode forms the cathode and includes active particles comprising intercalation materials. The anode consists of activated carbon, polymeric binders, and conducting carbon black or graphite.

Figure 7:
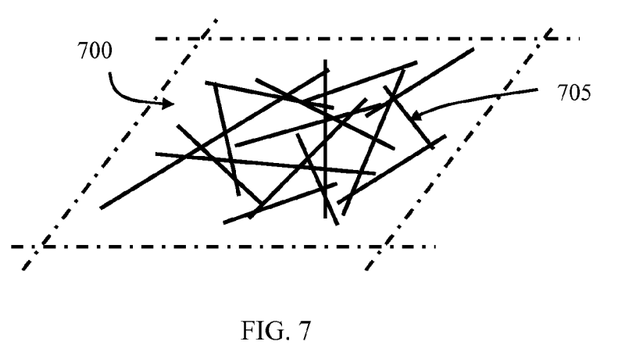
FIG. 7 shows a diagrammatic representation of a portion of a third illustrative electrode incorporating the FIG. 1 hybrid structure.
Figure 8:
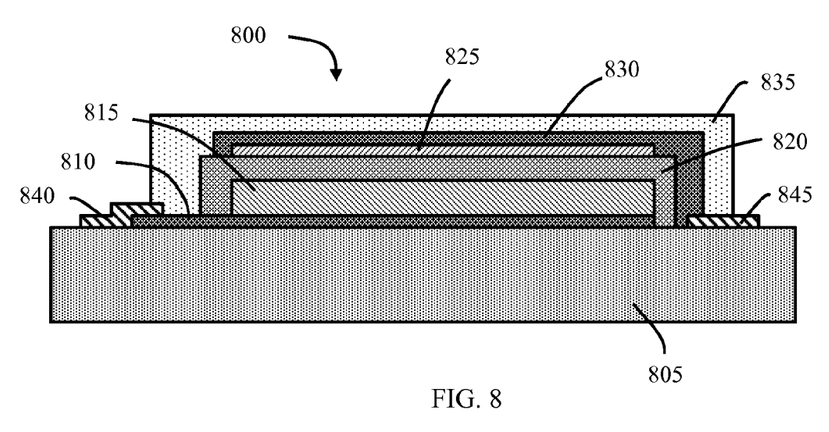
FIG. 8 shows a sectional view of an illustrative battery capable of utilizing the electrode shown in FIG. 7.

In another electrode design capable of using hybrid structures in accordance with aspects of the invention, the hybrid structures may be randomly stacked to form a thin-film electrode. FIG. 7 shows a diagrammatic representation of a portion of one such thin-film electrode 700, here with the hybrid structures represented as simple rods for ease of understanding. In this case, hybrid structures 705 similar to the hybrid structure 100 in FIG. 1 are randomly stacked to form a thin, porous interconnecting network. Such a thin-film electrode may be used in thin-film micro-batteries. A sectional view of such a micro-battery 800 is shown in FIG. 8. The micro-battery 800 comprises a substrate 805, a cathode current collector 810, a cathode 815, an electrolyte 820, an anode 825, an anode current collector 830, and a protection layer 835. A first contact 840 connects to the cathode current collector 810, while a second contact 845 connects to the anode current collector 830.

In this particular illustrative micro-battery embodiment 800, the anode 825 may be formed from a thin-film electrode like the thin-film electrode 700 shown in FIG. 7 with the active particles comprising an active metal or metalloid (e.g., Si, Ge, Sn), a transition metal oxide (e.g., $SnO_2$, $Fe_xO_y$, $MnO_2$), or a conducting polymeric material (e.g., PANi, PPy, PEDOT). The cathode 815 may comprise an intercalation material (e.g., $LiFePO_4$, $LiMnPO_4$, $LiCoO_2$, $LiMn_2O_4$, $LiNiO_2$, $Li(Li_aNi_bMn_cCo_d)O_2$)). The electrolyte 820 may comprise lithium phosphorous oxynitride (i.e., LiPON; $Li_3PO_4$), which is commonly utilized in these types of devices. The cathode current collector 810, the anode current collector 830, the first contact 840, and the second contact 845 may comprise copper, nickel, or aluminum. Lastly, the protection layer 835 may comprise a polymer (e.g., Parylene-C). One or more elements of the micro-battery 800 may be deposited by common deposition techniques such as, but not limited to, RF and DC magnetron sputtering, thermal evaporation deposition, chemical vapor deposition, pulsed laser deposition, electron cyclotron resonance sputtering, aerosol spray coating, and several other techniques that will already be familiar to one having ordinary skill in the art.

While the hybrid structures described above have an elongate, somewhat fiber-like shape, hybrid structures in accordance with aspects of the invention may alternatively be formed with a more spherical, powder-like morphology. This modification can be achieved by simply making the wires 300 shorter when performing the method 200 described in FIG. 2. The resulting hybrid structure may appear like that shown diagrammatically in FIG. 9. In this figure, the hybrid structure 900 comprises active particles 905 encapsulated by an encapsulating film 910 (e.g., graphene). For clarity, the frontal portion of the encapsulating film 910 is, as before, made transparent to show the active particles 905 residing within the hybrid structure 900. Spherical, powder-like hybrid structures like the hybrid structure 900 may be incorporated into a battery such as the battery 600 shown in FIG. 6 by mixing the hybrid structures 900 with a polymer binder (e.g., poly(vinylidene fluoride, poly(acrylic acid)) at a predetermined ratio, and then pasting the mixture onto the cathode current collector 605 or the anode current collector 630, as needed.

The unique physical and electrical characteristics of the hybrid structures 100, 900 set forth with reference to FIGS. 1 and 9, and, more generally, hybrid structures in accordance with aspects of the invention, impart several advantages to energy storage devices in which those hybrid structures are implemented as electrodes, particularly when the encapsulating films are formed from graphene.

Graphene encapsulating films in the hybrid structures, for example, confine the active particles within a compressive "shell" and, in so doing, allow the active particles to see repeated lithium ion insertion/extraction cycles without the active particles becoming detached, fragmented, or pulverized. Unwanted side reactions between the active particles and the electrolyte are thereby avoided.

Figure 10A:
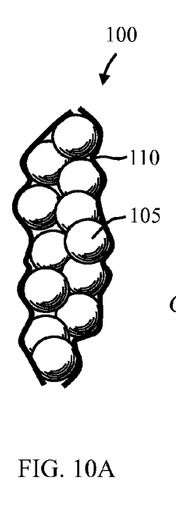
FIGS. 10A-10C show diagrammatic representations that illustrate the charging and discharging of the FIG. 1 hybrid structure.
Figure 10B:
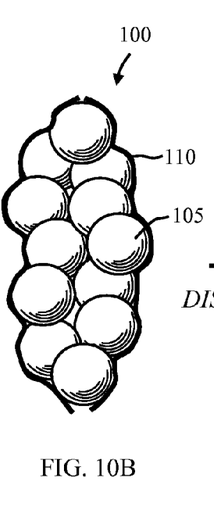
Figure 10C:
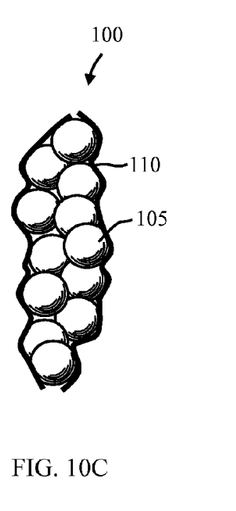

FIGS. 10A-10C show diagrammatic representations that illustrate the effect of charging (i.e, lithiation) and discharging (i.e., de-lithiation) on the hybrid structure 100 presented earlier in FIG. 1. As before, in these figures, the frontal region of the encapsulating film 110 is again made transparent to expose the encapsulated active particles 105 within. Charging the hybrid structure 100 indeed causes the active particles to expand (FIG. 10B). Nevertheless, when formed of graphene, the encapsulating film 110 is sufficiently elastic to reversibly and reliably accommodate this expansion and contraction. The cluster of active particles 105 within the hybrid structure 100 is thereby protected from stress-induced structural pulverization during ion uptake, and cycling life is enhanced.

As even another advantage, graphene-based encapsulating films are highly compressive, meaning that hybrid structures that incorporate these kinds of encapsulating films can pack tightly in an electrode without reducing the accessible surface area of their active particles. This, in turn, improves the volumetric energy density and rate performance of these electrodes.

Lastly, graphene encapsulating films, being highly conductive and able to maintain intimate contact with their active particles, impart hybrid-structure-based electrodes in which they are implemented with a lower internal resistance throughout. This also improves rate performance characteristics.

In closing, it should again be emphasized that the above-described embodiments of the invention are intended to be illustrative only. Other embodiments can use different processing steps, and different types and arrangements of elements to implement the described functionality. These numerous alternative embodiments within the scope of the appended claims will be apparent to one skilled in the art.

Moreover, all the features disclosed herein may be replaced by alternative features serving the same, equivalent, or similar purposes, unless expressly stated otherwise. Thus, unless expressly stated otherwise, each feature disclosed is one example only of a generic series of equivalent or similar features. While, as just one example, several specific materials are set forth herein as being suitable for use as active particles, such specific materials are only examples of many different materials that can be effectively utilized when actually reducing aspects of the invention to practice. Accordingly, these recitations of specific materials should not be construed as limiting the scope of the invention.

Any element in a claim that does not explicitly state "means for" performing a specified function or "step for" performing a specified function is not to be interpreted as a "means for" or "step for" clause as specified in 35 U.S.C. §112, ¶6. In particular, the use of "step of" in the claims herein is not intended to invoke the provisions of 35 U.S.C. §112, ¶6.

What is claimed is:

1. A method comprising the steps of:
   receiving a wire;
   depositing an encapsulating film on the wire;
   selectively removing the wire to leave a hollow tube formed of the encapsulating film;
   placing a plurality of active particles into the hollow tube by immersing the hollow tube in a suspension comprising the plurality of active particles and a liquid;
   removing the hollow tube and the plurality of active particles therein from the suspension; and
   allowing the hollow tube and the plurality of active particles therein to dry so as to form a cluster of active particles at least partially encapsulated by the encapsulating film.

2. The method of claim 1, wherein the wire comprises at least one of copper and nickel.

3. The method of claim 1, wherein the encapsulating film substantially consists of a single layer of graphene.

4. The method of claim 1, wherein the encapsulating film comprises multiple layers of graphene.

5. The method of claim 1, wherein the depositing step comprises chemical vapor deposition.

6. The method of claim 5, wherein the chemical vapor deposition utilizes hydrogen and methane.

7. The method of claim 1, wherein the step of selectively removing the wire comprises depositing and stripping a thermoplastic material.

8. The method of claim 1, wherein the step of selectively removing the wire comprises wet chemical etching.

9. The method of claim 1, wherein the plurality of active particles comprise at least one of a metal, a metalloid, a transition metal oxide, a lithium metal phosphate, a lithium metal oxide, and a conductive polymer.

10. The method of claim 1, wherein the liquid comprises water.

11. The method of claim 1, wherein the step of removing the hollow tube and the plurality of active particles therein from the suspension comprises at least one of centrifugation and filtering.

12. The method of claim 1, further comprising the step of installing the cluster of active particles at least partially encapsulated by the encapsulating film into an energy storage device.

13. The method of claim 12, wherein the energy storage device comprises a battery or a supercapacitor.

* * * * *